Dec. 12, 1950  E. T. ROSS ET AL  2,534,063
MANUFACTURE OF INSOLUBLE SULFUR
Filed Feb. 12, 1945
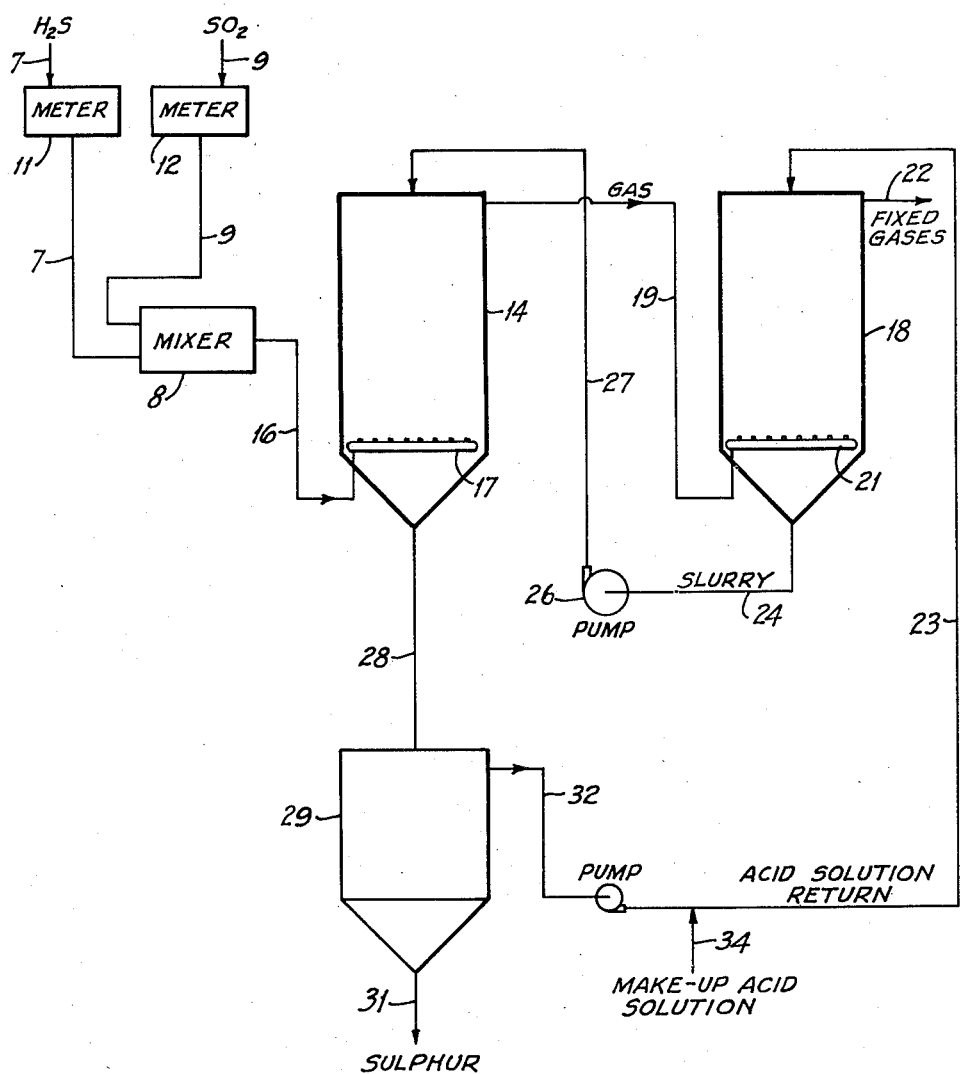
INVENTORS
Earl T. Ross
Cecil B. Wilde
BY
Robert H. Eckhoff
ATTORNEY Patented Dec. 12, 1950

2,534,063

UNITED STATES PATENT OFFICE 2,534,063

MANUFACTURE OF INSOLUBLE SULFUR

Earl T. Ross, Los Angeles, and Cecil B. Wilde, Compton, Calif., assignors to Stauffer Chemical Company, a corporation of California Application February 12, 1945, Serial No. 577,438

2 Claims. (Cl. 23—225)

This is a continuation-in-part of our application Serial No. 457,046, filed September 2, 1942, now abandoned.

This invention relates to a process for the production of that form of sulphur which is insoluble in carbon bisulphide. This sulphur has many uses; for example, it is widely used in the manufacture of various vulcanized rubber products from natural rubber and from those other materials generally termed synthetic rubber.

Present known methods of manufacture of insoluble sulphur are such that very poor yields of this form of sulphur result. As a consequence, insoluble sulphur is quite costly to produce and is therefore necessarily high priced. The process of the present invention enables insoluble sulphur to be produced with an insoluble sulphur content in excess of 80%.

We have discovered that hydrogen sulphide and sulphur dioxide, substantially in the proportions indicated by the reaction

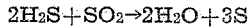

$$2H_2S + SO_2 \rightarrow 2H_2O + 3S$$

can be reacted to produce sulphur containing a very substantial percentage of that form of sulphur which is insoluble in carbon bisulphide. This form of sulphur is generally termed sulphur mu or S mu. The product produced in accordance with this invention contains S mu in a quantity equivalent to 75% by weight and more. This product can be used as such in natural rubber vulcanization, as disclosed in the Endres Patent 1,875,372 or, prior to use, it can be treated with a suitable solvent to extract the soluble sulphur content and provide a completely insoluble product as is disclosed in the Gracia Patent 1,923,723.

Sulphur dioxide and hydrogen sulphide are each present in various types of waste gases. These are usually disposed of in various ways, none of which generally secures full economic utilization of the sulphur value present. By reacting the gases, we are able to dispose of the gases so they do not provide an atmospheric pollution problem and, at the same time, produce a valuable product.

We have found that to secure a goodly yield of S mu in the product it is essential to react the gases in an acid medium, and particularly one containing a predetermined quantity of acid. Hydrogen sulphide and sulphur dioxide have been reacted heretofore in the proportions of two of the former to one of the latter. However, so far as we are aware, none of the prior investigators either observed the presence of insoluble sulphur or secured even inadvertently any substantial percentage thereof in the product. This we believe was due to the fact that no one heretofore has discovered that the acidity of the bath plays an essential and controlling part.

For example, when the aqueous medium is acidified so as to provide a hydrogen ion activity between 1 and 7 gram ions per liter, we have obtained sulphur containing in excess of 75% insoluble sulphur. This material is separated from the reaction medium as a plastic mass which if permitted to stand in the atmosphere for 48 hours can be ground, if desired. The sulphur assayed by chemical analysis around 90% sulphur, the rest being water, etc. Ignition of the sulphur product failed to yield any ash. If the hydrogen ion activity is increased above 7 mols per liter or is decreased below 1 mol per liter the insoluble content of the sulphur drops off materially. The highest insoluble sulphur content is secured when the hydrogen ion activity is between 4.5 and 6.5 (mols $H^+$ per liter), the product containing better than 80% insoluble sulphur. The optimum is at 5.75. The term "activity" as used with reference to the hydrogen ion is employed in its usual sense and as defined, for example, by Taylor, Physical Chemistry (second edition), vol. I, pages 754–755 (Van Nostrand, New York, 1931), reference being had particularly to Taylor's equation (44) on page 755.

To acidify the aqueous bath we have successfully used sulphuric acid, hydrochloric acid, phosphoric acid and acetic acid. The strength of acid should be such that the hydrogen ion activity is between 1 and 7 ions per liter. As illustrative, we have used a bath containing at least 25% sulphuric acid and up to 50%, to produce a sulphur containing above 75% of insoluble sulphur. A sulphur containing 80% of insoluble sulphur was also produced using a bath containing 76% of phosphoric acid and another containing glacial acetic acid (99½%). Hydrochloric acid solutions containing between 14%–18% by weight of the acid resulted in products containing more than 80% of the insoluble sulphur.

The invention will become further apparent upon considering the following example set forth herein as illustrative of a practice of the process of our invention. The single figure in the drawing is a diagram of apparatus and a flow sheet which can be employed.

Hydrogen sulphide was fed through line 7 to a mixer 8 into which sulphur dioxide was also fed through line 9. Meters 11 and 12 were included in lines 7 and 9 so the respective gas flows could be proportioned. After thorough mixing in mixer 8, the gas stream was introduced through line 16 into reactor 14, wherein the gas stream was released through a bubbler pipe 17. A second reactor 18 was also provided, unreacted gases being withdrawn through line 19 from reactor 14 for release through a bubbler pipe 21. The reaction was usually completed in the second reactor and fixed gases released from it through line 22.

The acidified reaction medium was introduced into the second reactor 18 through line 23, being fed into the reactor at a rate sufficient to maintain adequate liquid-gas contact. The acidified reaction medium and sulphur formed were withdrawn from the bottom of the second reactor and passed through line 24, pump 26 and line 27 to the first reactor 14. The sulphur-reaction medium were withdrawn from the first reactor through line 28 into a separator 29 wherein the sulphur settled out and was withdrawn through line 31. The acidified medium was taken off through line 32 and was forced back by pump 33 through line 23, additional make-up acid or acidified medium being added through line 34 to offset the dilution which occurred from the reaction and the loss of medium in removal of wet sulphur through line 31.

Gas liquid contact means in the reactors can be provided if desired. Also, we have omitted any showing of flow porportioning means, valves, pressure control devices, since those skilled in the art can readily provide these to suit their individual views.

In one operation, a gas containing 95% $H_2S$ and another containing 9% $SO_2$ were premixed dry, the other constituents present being inert gases not affecting the operation. These mixed gases were then passed through an aqueous hydrochloric acid solution providing a hydrogen ion activity of 6.45 gram ions per liter. The reactors were cooled to maintain the liquid at 80° F. to reduce the rate of reversion of the sulphur mu formed to the carbon bisulphide soluble form. The gases were introduced continuously for six hours; the product secured was removed and permitted to harden by drying in the atmosphere for three days. It was then found to contain 81.8% of sulphur insoluble in carbon bisulphide. The reaction was substantially complete so the over-all sulphur yield corresponded to the theoretical.

The reaction is slightly exothermic and the temperature of the acidified reaction medium will rise if cooling is not practiced. Since at higher temperatures the rate of reversion of the insoluble form to the soluble form is higher, it is preferable to operate at lower temperatures, at least at usual room temperatures, 65°–75° F. and preferably lower although economic factors will control this.

We have secured a product containing over 75% insoluble sulphur when the hydrogen ion activity of the bath was maintained in the range of 1 to 7 gram ions per liter, the gases merely being mixed and introduced for reaction. The reaction is substantially quantitative so long as the two are correctly proportioned. In one specific operation the two gases were mixed in the correct proportions and introduced into reactor 14 at the rate of 132 pounds per hour and over a period of six hours. The bath had an hydrogen ion activity of 5.35 gram ions per liter and was held at 80° F. The sulphur product removed contained 83½% of insoluble sulphur and corresponded in weight to the theoretical quantity.

The product recovered is wet with the acid bath. In addition, it is somewhat of a plastic in nature and it therefore is desirable to dry it. Since the ultimate user of the product generally requires it to be in finely divided form it is desirable to grind the product to this condition. If the product is permitted to remain in contact with the atmosphere it soon dries and becomes hard enough to grind after a few days. This is preferably accomplished at as low a temperature as is feasible to reduce the loss of insoluble sulphur by reversion to the soluble form. The sulphur product can also be dried and hardened by holding it at an elevated temperature for from one to six hours depending on the temperature. This heat treatment also stabilizes the insoluble sulphur against subsequent reversion, making it more resistant to change if subject to heat. For example, by holding the product at 140° for from one to two hours the drying is accomplished, the product stabilized and hardened. Temperatures in the range of 86° F. to 176° F. can be employed, the time required varying with the temperature and the wetness of the product, from one hour to several days being beneficial. The stabilizing effected is indicated by comparison of two lots of the initially identical material, one of which is permitted to stand at ordinary room temperature (68° F.) and the other at 122° F. for five days. The original mass contained only 87% insoluble sulphur while the high temperature treated mass contained 95.0% insoluble sulphur after four hours reflux with carbon bisulphide.

We claim:

1. A process for manufacture of insoluble sulphur comprising passing gaseous hydrogen sulphide and gaseous sulphur dioxide simultaneously in the proportion of about two mols of the hydrogen sulphide to about one mol of the sulphur dioxide into an aqueous bath having an hydrogen ion activity of between 4.5 and 6.5 gram ions for liter and wherein the hydrogen sulphide and sulphur dioxide react to form in said solution a precipitate of elemental sulphur containing carbon bisulphide insoluble sulphur, and separating the sulphur from the solution.

2. A process for manufacture of insoluble sulphur comprising passing gaseous hydrogen sulphide and gaseous sulphur dioxide simultaneously in the proportion of about two mols of the hydrogen sulphide to about one mol of the sulphur dioxide into an aqueous bath having an hydrogen ion activity of about 5.75 gram ions per liter and wherein the hydrogen sulphide and sulphur dioxide react to form in said solution a precipitate of elemental sulphur containing carbon bisulphide insoluble sulphur, and separating the sulphur from the solution.

EARL T. ROSS.
CECIL B. WILDE.

REFERENCES CITED

The following references are of record in the file of this patent:

FOREIGN PATENTS

| Number | Country | Date |
|---|---|---|
| 14,364 | Great Britain | 1885 |
| 8,164 | Great Britain | 1907 |

OTHER REFERENCES

Taylor, "Physical Chemistry", 2nd Ed., vol. I, pp. 754, 755, New York, D. Van Nostrand, 1931.